Nov. 11, 1941.    H. W. WILLIAMS ET AL    2,262,377
ELEVATOR SIGNAL SYSTEM
Filed Dec. 7, 1938    5 Sheets-Sheet 1

WITNESSES:
E. A. McCloskey.
Birney Himes

INVENTORS
Harold W. Williams
and Richard N. Jones.
BY
ATTORNEY

Nov. 11, 1941.   H. W. WILLIAMS ET AL   2,262,377
ELEVATOR SIGNAL SYSTEM
Filed Dec. 7, 1938   5 Sheets-Sheet 3

WITNESSES:
E. A. McCloskey.
Birney Hines

INVENTORS
Harold W. Williams
and Richard W. Jones.
BY
ATTORNEY

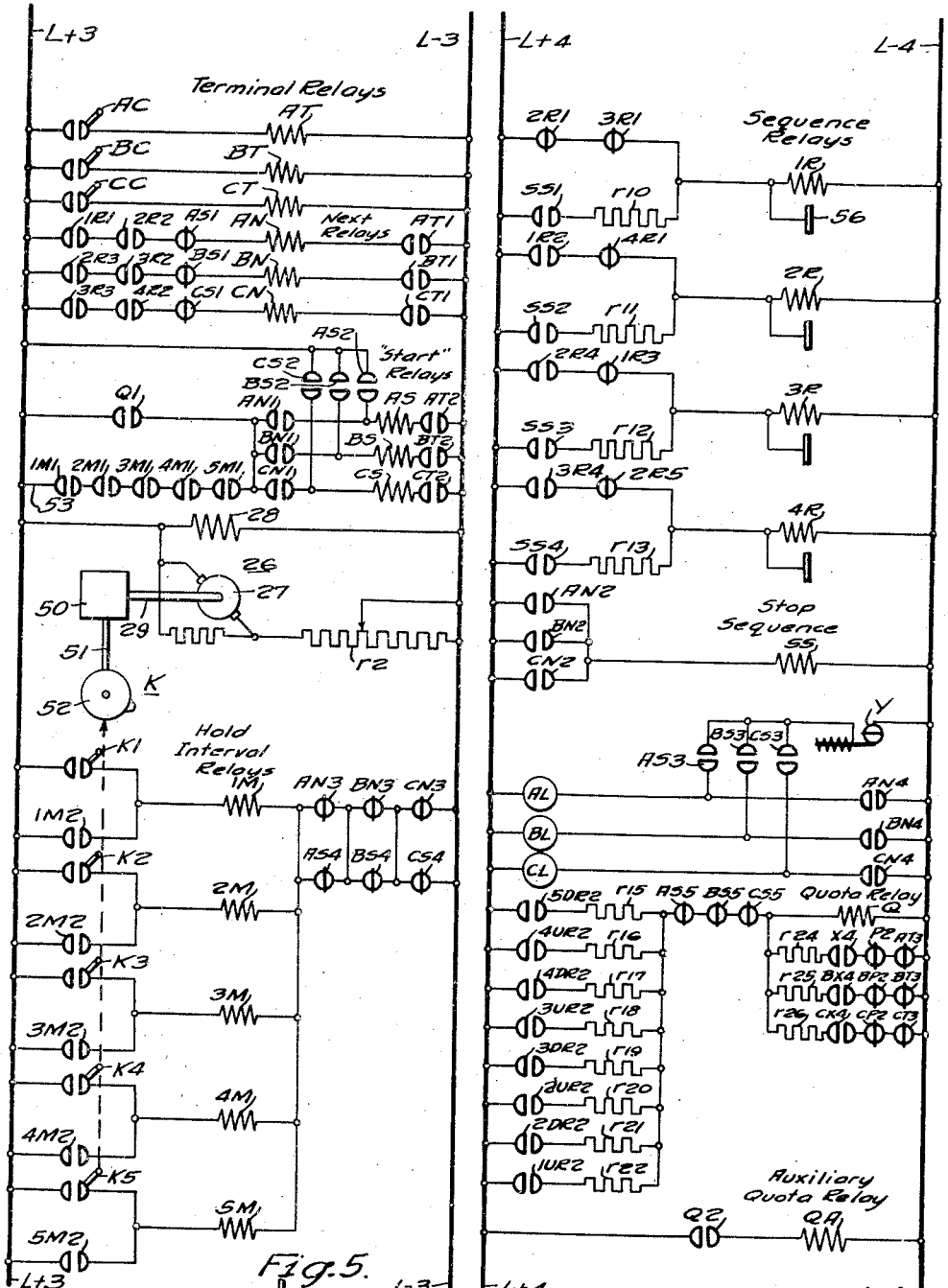

Patented Nov. 11, 1941

2,262,377

UNITED STATES PATENT OFFICE 2,262,377

ELEVATOR SIGNAL SYSTEM

Harold W. Williams, Jersey City, N. J., and Richard W. Jones, Winnetka, Ill., assignors to Westinghouse Electric Elevator Company, Jersey City, N. J., a corporation of Illinois Application December 7, 1938, Serial No. 244,398

22 Claims. (Cl. 177—336)

Our invention relates to signal systems for elevator cars, and more particularly to means for controlling the giving of dispatching signals to the cars.

In the elevator installations heretofore provided with dispatching systems, the starting signals have usually been given by a timing mechanism at predetermined intervals and, in some instances, means have been provided for increasing the speed of the timing mechanism when the number of unanswered calls registered by waiting passengers exceeds a predetermined total. However, such systems do not cause the cars to receive dispatching signals as soon as a predetermined number of registered calls for service accumulate.

Therefore, one object of our invention is to provide for the giving of a "start" signal to a car at a dispatching floor as soon as a predetermined number of registered calls for service accumulate.

A further object is to provide a system which shall respond to abnormal operating conditions and cause dispatching signals to be given at such times as will better the service rendered by the cars.

Another object is to provide for giving dispatching signals to additional cars as soon as additional predetermined numbers of calls accumulate.

A still further object of our invention is to provide a quota system for elevator installations which will effect the dispatching of the cars in the most efficient manner, and which shall at the same time, be simple and inexpensive to construct, install, operate and maintain in operation.

An additional object is to provide a mechanism responsive to the number of down moving cars in a bank of elevators for determining how many calls for service must be registered before an earlier than normal dispatching impulse is given to a car at one of the terminals.

For a better understanding of the invention, reference may be had to the accompanying drawings, in which.

Figure 1:
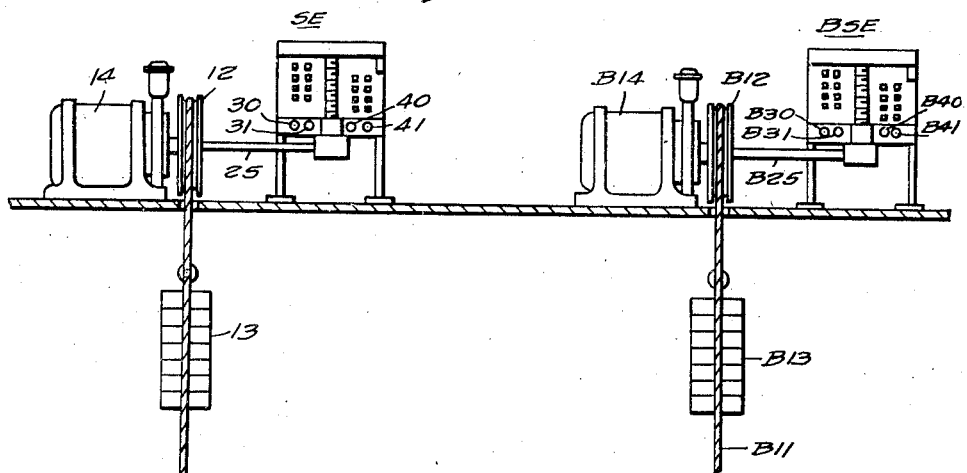
Figure 1 is a diagrammatic representation of an elevator system embodying our invention.
Figure 3:
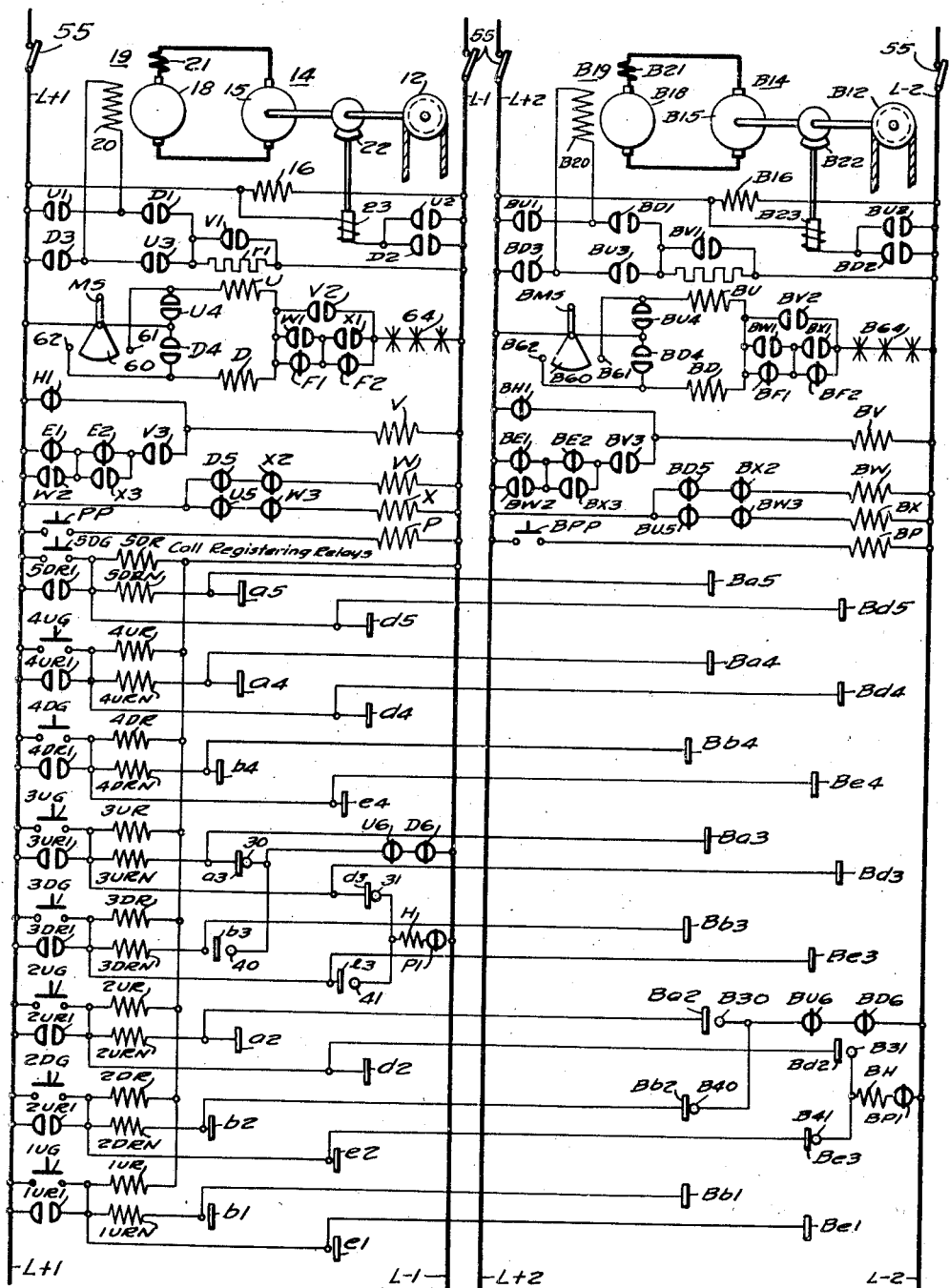
Figure 3A:
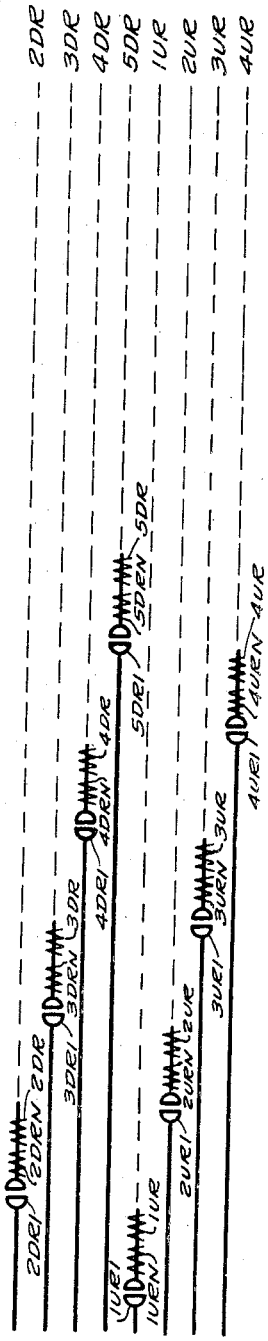
Figure 3A:
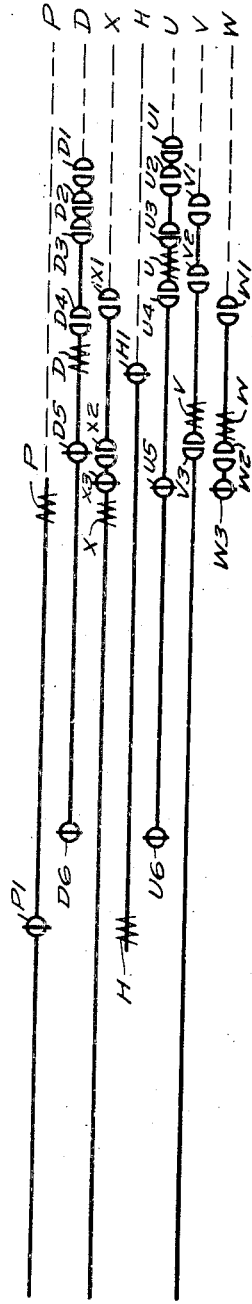
Figure 4A:
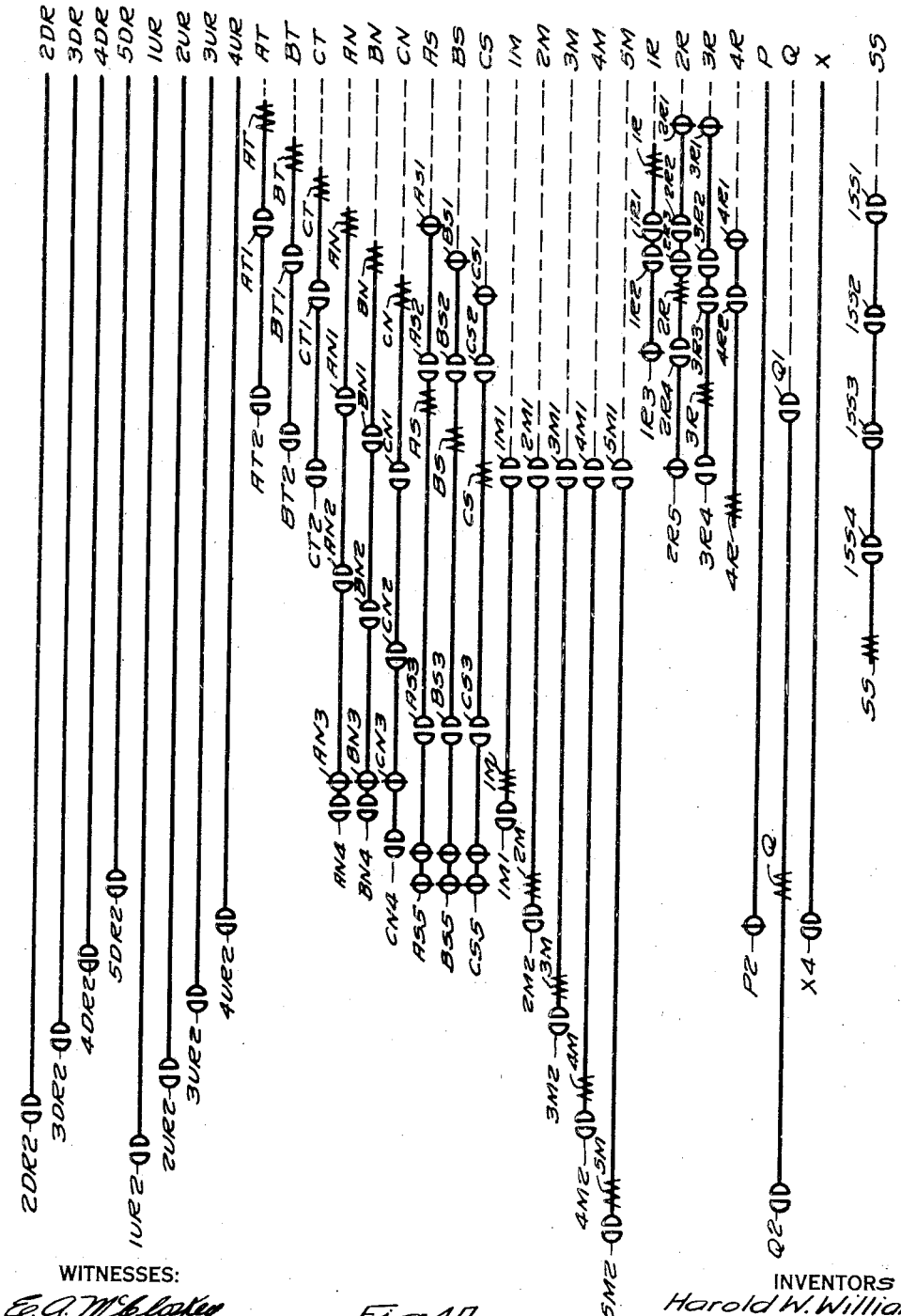

Figs. 3 and 4 collectively constitute a diagrammatic representation, in what is known as "straight-line" style, of the signal and control system of the elevator system shown in Fig. 1;

Figs. 3A and 4A constitute an explanatory representation of the switches, relays and associated contact members embodied in Figs. 3 and 4; and Fig. 5 is a diagrammatic representation of the timing motor included in Fig. 4 operating the cam switches associated with it.

The illustration of the relays in Figs. 3A and 4A shows them with their coils and contact members disposed in horizontal alignment with their positions in the straight-line circuits of Figs. 3 and 4, so that the position of the coil and the contact members of any relay in the straight-line circuits may be readily determined.

In reading the circuits, Fig. 4 should be placed under Fig. 3; Fig. 3A placed beside Fig. 3; and Fig. 4A placed under Fig. 3A and beside Fig. 4.

The main relays and switches included in the circuits are designated by the following reference characters:

Relays individual to each car

U=up direction switch
D=down direction switch
W=up direction relay
X=down direction relay
P=by-pass relay
V=high speed relay
H=stopping relay
E=slow-down inductor
F=stopping inductor
T=terminal relay
L=dispatching signal lamp
N="next" dispatching signal relay
S="start" dispatching signal relay
Y=flicker relay

Relays common to system

M=hold timing-interval relays
R=sequence or ring relays
SS=stop sequence relay
UR=up call registering relay
DR=down call registering relay
K=controller operated by timing device
G=floor buttons
Q=quota relay
QA=auxiliary quota relay Referring more particularly to the drawings, we have illustrated an elevator system for three cars A, B and C serving five floors. Fig. 1 illustrates the car A, the hoisting apparatus for cars A and B but does not show the cars B and C or the hoisting apparatus for car C. Fig. 3 shows the control system for the cars A and B but not for car C. Fig. 4 shows the circuits for our improved dispatching system for all three cars A, B and C. Although we illustrate the invention as applied to a specific number of cars for a specific number of floors, it is to be understood that the invention may be readily applied to any elevator installation embodying a greater or a less number of cars and floors.

The relays and switches individual to each car will be described in connection with car A and similar apparatus for cars B and C will be given the same reference characters preceded by the letter B or C according to the car to which they relate.

In Fig. 1, the car A is illustrated as suspended by a cable 11 passing over a hoisting drum 12 to a suitable counterweight 13. The hoisting drum is directly coupled to a hoisting motor 14.

In Fig. 3, the hoisting motor 14 is illustrated as comprising an armature 15 and a field winding 16, the field winding 16 being connected for constant voltage energization to a source of energy designated by supply conductors L+1 and L−1. A variable voltage system of control is provided for operating the hoisting motor 14 wherein the armature 15 is connected in a closed circuit with the armature 18 of a generator 19. The generator is provided with a separately excited field winding 20 and a cumulative series field winding 21. A resistor r1 is connected in the circuit of the separately excited field winding 20 for controlling the voltage of the generator and consequently, the speed of the motor 14. The armature 18 of the generator may be driven by any suitable driving means (not shown).

An electromagnetic brake 22 is provided for applying a braking effect to the hoisting drum 12 when the car is brought to a stop, the brake coil 23 being energized to release the brake when the car is running and being deenergized to apply the brake when the supply of power to the car is cut off.

The direction and speed of operation of the hoisting motor 14 may be suitably controlled by controlling the direction and value of the excitation current that is supplied to the separately excited field winding 20 of the generator 19. The direction of the excitation current for the field winding 20 may be suitably controlled by means of an up direction switch U and a down direction switch D while the value of the current supplied to the field winding may be controlled by means of a high-speed relay V which controls the resistor r1.

The up direction and the down direction switches are controlled by a master car switch MS disposed in the car so that the car may be started either up or down by the car attendant moving the car switch to energize the up direction or the down direction switch.

The system may be so arranged that the centering of the car switch will stop the car or, if desired, so that it will be stopped by an automatic stopping means. In the present illustration, we have included an automatic stopping means such as the inductor relay system illustrated in U. S. Patent 1,884,446, dated October 25, 1932, and in Patent No. 2,104,522, dated January 4, 1938, assigned to the Westinghouse Electric Elevator Company. The use of the inductor relay stopping system is represented by the inductor relays E and F disposed on car A in Fig. 1. The inductor relay E is for decelerating the car from its normal running speed to its stopping speed, and the inductor relay F is for stopping the car when it gets down to its stopping speed and is within a predetermined distance of the floor level. A plurality of inductor plates (not shown) may be disposed in the hatchway for operating the inductor relays as the car approaches a floor at which a stop is to be made.

The automatic stopping means may be put into operation by push buttons in the car (not shown) and by push buttons or call devices at the floor landings. These buttons are common to all the cars and the operation of a button at a floor will stop an approaching car for the corresponding direction at that floor. The floor push buttons for the up direction are indicated as 1UG to 4UG, inclusive, for the 1st, 2nd, 3rd and 4th floors, and the floor buttons for the down direction are indicated as 2DG1 to 5DG1, inclusive, for the 2nd, 3rd, 4th and 5th floors.

Associated with each of the floor push buttons is a call registering relay, by means of which the momentary pressing of the button will set up or register a stop call which will hold itself until it is answered by the stopping of a car at that floor. The call registering relays for the up floor buttons are designated as 1UR, 2UR, 3UR and 4UR for the 1st, 2nd, 3rd and 4th floors and those for the down buttons are designated as 2DR, 3DR, 4DR and 5DR for the 2nd, 3rd, 4th and 5th floors.

A cancellation coil is wound on each call registering relay in opposition to its registering coil to cause the cancellation of any call registered thereon when a car stops to answer it. The cancellation coils are designated as 1URN, 2URN, 3URN and 4URN for the up registering relays, and as 2DRN, 3DRN, 4DRN and 5DRN for the down registering relays.

The car A is provided with a by-pass button PP and a by-pass relay P to permit the attendant thereon to by-pass any registered stop calls when desired. The cars B and C have similar by-pass buttons.

In order that the circuits for the call registering relays and the cancellation coils thereon may be connected for operation in accordance with the position of the cars with respect to the floors, each car is provided with a floor selector. The floor selectors may be of any suitable type such as are usually employed in elevator systems, and may be located at any suitable point, such for example, as in the penthouse or in the elevator shaft.

Figure 2:
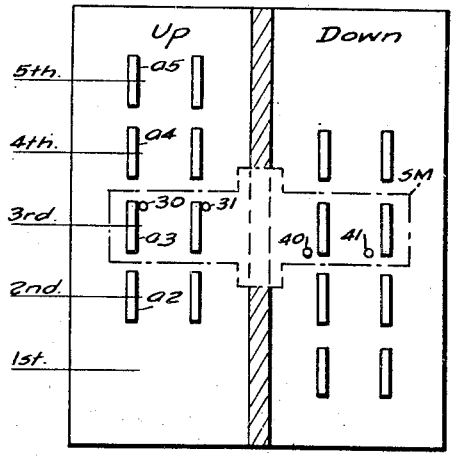
Fig. 2 is a diagrammatic representation of the floor selector contacts and brushes for one of the cars.

The floor selector for car A is designated by the letters SE and is provided with a set of contact segments (Fig. 2) arranged according to the floors and disposed to be engaged by cooperating brushes 30 and 31 for the up direction and 40 and 41 for the down direction. The brushes are mounted upon and insulated from a suitable arm SM which is operated in accordance with the movements of the car by means of a screw shaft 24 driven by some part of the operating mechanism of the car; as for instance, by the shaft 25 attached to the hoisting drum 12 (Fig. 1). The frictional engagement between the arm SM and its operating screw will cause the arm to bear against the up contact segments when the car is travelling upwardly, and against the down contact segments when the car is travelling downwardly, as is described in the Smalley and Reiners Patent 634,220 of October, 1899. Other methods, such as that in which the arm SM moves a predetermined distance when the associated car passes a point between floors, may also be used equally well.

The cars are provided with a dispatching system including a dispatching signal lamp in each car and a timing mechanism for operating them to give the cars starting signals from a dispatching floor at predetermined intervals. The lamp in car A is designated as AL, that for car B as BL, and that for car C as CL. When the signal lamp in a car is operated to glow steadily, it gives a "next" signal, indicating to the attendant in that car that his car is to be the next car to receive a dispatching signal. When the lamp is caused to flicker, it gives a "start" signal, indicating to the attendant that he should start his car immediately for a trip. Any floor may be selected as the dispatching floor. In the present case, the fifth floor has been selected as the dispatching floor.

The timing mechanism comprises a motor 26 having an armature 27 and a field winding 28. An adjustable resistor $r2$ is disposed in the circuit of the armature 27 for controlling the speed of the timing motor. The armature 27 is connected, through a shaft 29, a gear reducing device 50, and a shaft 51, to a controller K comprising a cam 52 disposed to sequentially operate a plurality of cam switches K1 to K5 inclusive, (lower left-hand corner of Fig. 4). The arrangement of the cam switches K1 etc., to be sequentially operated by the cam 52, is illustrated in Fig. 5, by means of which it will be seen that the cam switches are operated in sequence during each revolution of the controller cam. It is to be understood that the timing motor 26 is connected to run steadily at a constant speed and to keep closing the cam switches sequentially to provide timing impulses for operating the dispatching signal lamps at predetermined intervals at a dispatching floor.

A plurality of time interval relays are provided to be operated by the closing of the cam switches K1, etc. These interval relays are designated as 1M to 5M inclusive. When no car is at the dispatching floor to receive a starting signal and the timing motor has operated the interval relays 1M to 5M inclusive, to give a starting signal impulse, they will remain energized to hold the starting signal impulse until some car arrives at the starting floor and is conditioned to receive the starting signal.

The terminal relays AT, BT and CT (one for each car) are provided for preparing circuits for the next car to receive its dispatching signal. The terminal relay AT for car A is energized by a cam switch AC that is closed by car A arriving at the dispatching floor, as shown in the lower left-hand corner of Fig. 1. Cars B and C are provided with similar switches BC and CC.

The sequence or ring relays 1R to 4R inclusive, are provided to cooperate with the terminal relays in selecting or picking out the car which should receive the "next" signal. Each of the sequence relays is provided with a dashpot or time element to delay its operation for approximately one second. The ring relays are connected directly across the supply circuit L+4, L—4 and operate sequentially in a continuous manner until some car is given a "next" signal.

The "next" relays AN, BN and CN for the cars are operated by cooperative action of the terminal relays and the sequence relays; and, when one is energized, it closes the circuit for its signal lamp and causes it to glow steadily to give a "next" signal for indicating to the attendant that his car will be next to receive the dispatching signal to start.

The stop sequence relay SS is provided to be energized when one of the "next" relays is energized thus stopping the operation of the sequence relays 1R etc. until the car which has received the "next" signal has received its "start" signal and departed in accordance therewith. The stop sequence relay SS stops the ring relays by closing its contact members SR1 to SR4 inclusive, in the circuits for the ring relay. If any ring relay is energized when the stop sequence relay operates, that ring relay will remain energized because sufficient current will flow through the closed contact members SS and the resistors $r10$, etc., to maintain it in its energized condition, but not to energize it if it is in deenergized condition. Hence, energization of the stop sequence relay SS stops the ring relays from further sequential operation but maintains them in the condition in which it finds them until the "next" car leaves the dispatching signal.

The "start" signal relays AS, BS and CS, one for each car, are operated by the interval relays 1M to 5M inclusive, and are provided for causing the "start" signal to be given to the cars. The "start" relays accomplish this by inserting a flicker relay Y in circuit with the dispatching signal lamp to thereby cause that lamp to flicker its light, for the purpose of indicating to the attendant on the car that he should start away from the dispatching floor.

The system so far described will cause cars at the dispatching floor to receive "next to start" signals and then "start" signals, thus causing the cars to leave the dispatching floor at regular intervals of time. However, we have found that there are times when large numbers of stop calls are registered at about the same time by passengers at different floors where the ordinary dispatching system giving starting signals at regular intervals of time will not cause the cars to leave the dispatching floor quickly enough to give the best service possible. Therefore, we have provided a novel system for operating the signal devices to give a "start" signal just as soon as a predetermined number of registered stop calls accumulate without waiting for the expiration of a timing interval. To accomplish this purpose, we have provided a device such as a quota relay Q which causes a quota dispatch signal to be given to a car, depending on the quota setting (characteristics of the relay Q), the number of cars travelling, and the number of calls registered for both up and down. Any floor may be selected as the point where the quota dispatch signal is to be given or the system may be arranged to give dispatching signals at a plurality of floors, for instance at both terminals.

As a suitable means for causing the quota relay to operate upon the existence of a predetermined number of calls, we include in its circuit a plurality of call resistors $r15$ to $r22$ inclusive, disposed in parallel with each other but in series with the relay Q, each resistor corresponding to a call registering relay and being controlled by a pair of contact members disposed to be controlled by and closed by that relay when a call is registered on it. The quota relay is adjustable for pick-up and drop-out and is selected to operate when a predetermined number of circuits are completed through the parallel call resistors $r15$, etc. For example, if down calls are registered at the 4th, 3rd and 2nd floors, sufficient current will flow through the resistors $r17$, $r19$ and $r21$ to energize the quota relay and cause it to give an immediate starting signal to the "next" car at the dispatching floor.

A plurality of preventive resistors $r24$, $r25$ and $r26$, one for each car, are disposed in parallel with the quota relay coil Q. The connection of each of these resistors in parallel with the relay Q is controlled by the direction relays, the by-pass relay and the terminal relay of the car with which it is associated. Each preventive resistor has a value equal to that of the coil of the quota relay. If relay Q picks up because a predetermined number of registered calls feed it enough current to energize it, it gives a "start" signal to the car at the upper terminal. As that car goes on its down trip, its direction relay X shunts relay Q with its preventive resistor so that it now requires twice as many registered calls to pick up relay Q, because half the current is diverted through the preventive resistor. If a third car starts down, two preventive resistors parallel relay Q and two-thirds of the current passed by the call relay resistors is diverted and three times as many calls must be registered to cause relay Q to pick up. The up calls are included as it is desirable to have a system responsive to the whole call loading rather than to just the down calls.

The car A is provided with a by-pass button PP which operates a by-pass relay P to cause it to by-pass registered stop calls. Each of the cars B and C is provided with similar by-pass buttons and relays.

An assumed operation of the system is as follows: The main line switches 55 are closed to prepare the system for operation. The closing of these switches energizes the field windings 16 and B16 of the hoisting motors, the field winding 28 and the armature 27 of the timing motor 26, the coil of the sequence relay IR, and the high speed relay V.

The energization of the timing motor 26 rotates the cam 52 to close the switches K1 to K5, inclusive, in sequence. The closing of the switch K1 energizes the interval relay 1M to close its self-holding contact members 1M2 and its contact members 1M1 in the common circuit 53 for the "start" relays. The closing of the contact members K2 energizes the interval relay 2M to close its self-holding contact members 2M2 and its start relay contact members 2M1. The closing of the contact members K3 energizes the interval relay 3M to close its self-holding contact members 3M2 and its contact members 3M1 in the circuit for the start relays. The closing of the contact members K4 energizes the interval relay 4M to close its self-holding contact members 4M2 and its contact members 4M1 in the circuit of the start relays. The closing of the contact members K5 energizes the interval relay 5M to close its self-holding contact members 5M2 and its contact members 5M1 in the circuit of the start relays. All of the interval relays M are now energized and will remain energized to maintain the circuit of the starting relays in prepared condition until a starting relay is energized to give a starting signal. When a starting signal is given, the interval relays M will be deenergized to start another timing interval. The time required for the cam 52 to make one revolution for the purpose of sequentially closing the switches 1K to 5K is the timing interval between dispatching signals and it may be increased or decreased some by adjusting the resistor in the armature circuit of the timing motor.

The closing of the line switches 55 also energizes the ring or chain relay IR through the circuit:

$$L+4-2R1-3R1-IR-L-4$$

Relay IR in picking up closes its contact members 1R2 to energize coil 2R $$L+4-IR2-4R1-2R-L-4$$

The contact members 2R1 will then open the circuit previously traced to coil IR thus deenergizing that coil. However, relay IR does not move immediately to its deenergized position as this relay, as well as each of the relays 2R, 3R and 4R, is provided with a time delay device 56 which delays its opening for approximately 1 second. Therefore, about a second will expire before the armature of relay IR will drop out and both relays IR and 2R will remain in energized position during this time.

When the armature of relay IR drops out after the expiration of its one second delay, its contact members 1R3 close to complete a circuit to energize the coil of relay 3R $$L+4-2R4-IR3-3R-L-4$$

The relay IR also opens its contact members 1R2 to interrupt the previously traced circuit for coil 2R which drops after its time element expires. During this interval the armatures of relays 2R and 3R remain in the energized position. When the armature of relay 2R drops, its contact members 2R5 close to complete a circuit energizing the coil of relay 4R $$L+4-3R4-2R5-4R-L-4$$

Relay 2R also opens its contact members 2R4 to interrupt the previously traced circuit for relay 3R, which drops out after its time delay. During this time delay, the relays 3R and 4R remain in their energized positions.

When the armature of relay 3R drops out, its contact members 3R1 close the circuit to energize coil IR.

$$L+4-2R1-3R1-IR-L2$$

The relay 3R also opens its contact members 3R4 to interrupt the circuit to relay coil 4R which drops out after its time delay. During this interval the armatures of relay 4R and IR are in the energized position. Thus with no car at the floor, the relays IR to 4R continue picking up in a sequence requiring about four seconds for the cycle. Hence it will be apparent that these relays keep on sequentially preparing the circuits of the "next" relays for operation when a car arrives at the floor to give it a next to start signal.

As shown in Figs. 3 and 4, the diagram represents car A as being on an up trip at the third floor and car B as being on a down trip at the second floor. It will be assumed now that car B is moved to the lower terminal and then up to the second floor and allowed to remain thereat on an up trip. It will be assumed further that the attendant on car A, desiring to move that car to the upper terminal floor, moves the car switch MS in a counter-clockwise direction. This operation closes the contact members 60 and 61 of the switch MS, thus energizing the up direction switch U through the circuit $$L+1, 60, 61, U, V2, 64, L-1$$

The energized up direction switch U closes its contact members U1, U2, U3 and U4 and opens its contact members U5 and U6. The closing of the contact members U4 provides a self-holding circuit for the up direction switch U. The closing of the contact members U2 energizes the brake coil 23 to release the brake 22. The closing of the contact members U1 and U3 energizes the field winding 20 of the generator 19 to start the hoisting motor into operation to move the car upwardly. The opening of the contact members U5 deenergizes the down relay X which thereupon closes its contact member X2 thus energizing the up direction relay W to prepare the car A for up direction travel. The car now moves up to and stops at the upper terminal by the operation of the usual terminal switches (not shown).

As the car A comes into the upper terminal, its cam 56 (Fig. 1) engages its cam switch AC thereby energizing the terminal relay AT for car A by the circuit L+3, AC, AT, L—3 (upper left corner Fig. 4). The energized relay AT closes the contact members AT1 and AT2. The closed contact members AT1 prepare the circuit of the "next" relay AN for operation and the closed contact members AT2 prepare the circuit of the "start" relay AS for energization.

As the ring relays start their sequential operation, the relays 1R and 2R are both in energized position thereby closing the contact members 1R1 and 2R2 in the prepared circuit of relay AN thus energizing that relay

L+3, 1R1, 2R2, AS1, AN, AT1, L—3

The energized "next" relay AN closes its contact members AN4 thereby lighting the signal lamp AL in car A and causing it to glow steadily to indicate to the attendant in that car that it will be next to receive the starting signal. The energized relay AN also closes its contact members AN1 to prepare the circuit of its starting relay AS for operation when the timing relays 1M to 5M are in energized condition to give the next impulse for the starting signal. The energized relay AN also opens its contact members AN3 in one side of the circuit for the interval relays 1M to 5M.

In the meantime the timing motor 26 has been operating the controller K to energize the interval relays 1M to 5M inclusive, and it will be assumed that they are now all energized thereby completing the circuit for the "start" relay AS:

L+3, 1M1, 2M1, 3M1, 4M1, 5M1, AN1, AS, AT2 to L—3

The energized relay AS closes its self-holding contact members AS2 and also opens its contact members AS4 and closes its contact members AS3.

The opening of the contact members AS4 deenergizes the interval relays 1M to 5M so that the continued operation of the timing motor will again start to energize them consecutively to define the next timing interval for the dispatching signals.

The opening of the contact members AS1 deenergizes the "next" relay AN so that some other car can be selected for the next dispatching signal. The opening of the contact members AN4 of the deenergized relay AN stops the steady glow of the lamp AL thereby extinguishing the "next" signal for the attendant in car A. The opening of the contact members AN2 deenergizes the relay SS to start the ring relays 1R—4R into operation.

The closing of the contact members AS3 energizes the flicker relay Y by the circuit

L+4, AL, AS3, Y, L—4 which opens and closes its contact members to cause the lamp AL in car A to flicker thereby giving the attendant in that car a "start" signal to indicate that he should start on his down trip.

Upon receiving the "start" signal, the attendant in car A moves the car switch MS in a clockwise direction to start the car on a down trip. This movement of the car switch closes its contact members 60 and 62 thereby energizing the down direction switch D to effect downward operation of the car.

As car A is conditioned to make its down trip, its down direction relay X is energized and hence closes its contact members X4 to include the preventive resistor $r24$ in parallel position with the coil of relay Q. This preventive resistor $r24$ will prevent energization of the quota relay when three stop calls are registered and make it necessary for at least six registered calls to be in effect before the quota relay will be operated to effect the giving of a dispatching signal.

By the foregoing operation, it is seen that the timing motor, the interval relays, the sequence or chain relays, the "next" relays, the "start" relay and the terminal relays will cooperate to give the cars at the dispatching floor "next" signals followed by "start" signals at predetermined intervals of time and that they will hold a "start" signal beyond the timing interval until a car is at the dispatching floor to receive it.

It is also seen that, when a car is on a down trip, no operation of the quota relay will take place until an additional predetermined number of stop calls are registered. This is effected because the car already on its down trip will take care of the first quota of three calls.

It will be assumed that the car is run through to the lower terminal and back again to the upper terminal. It will also be assumed now, after the car arrives at the upper terminal, that waiting passengers at the fourth and third floors operate the down push buttons 4DG and 3DG to stop the car on its down trip, and that a waiting passenger at the third floor presses the up button 3UG to stop a car for the up direction. The pressing of the button 4DG closed its contact members thereby energizing the call registering relay 4DR by a circuit extending from supply conductor L+1, through 4DG and to supply conductor L—1. The energized relay 4DR closes its contact members 4DR1 and 4DR2. The closing of the contact members 4DR1 creates a self-holding circuit for the relay 4DR and energizes the down floor selector contact segments $e4$ and B$e4$ (also $cb4$, not shown) to stop the first down car. The closing of the contact members 4DR2 completes a circuit including the call resistor $r17$ for partially energizing the quota relay Q, this circuit extending L+4, 4DR2, $r17$, AS5, BS5, CS5, Q, L—4

The pressing of the push button 3DG energized the down call registering call relay 3DR to close its self-holding contact members 3DR1 and also its contact members 3DR2. The closed contact members 3DR1 also energize the down floor selector contact segments $e3$ and B$e4$ (also C$e4$, not shown) to stop the first down car at the third floor. The closing of the contact members 3DR2 includes the call resistor $r19$ in parallel with the call resistor $r17$ in the quota relay circuit L+4, 3DR2, $r19$, AS5, BS5, CS5, Q, L—4

This circuit supplies a second parallel circuit for partially energizing the quota relay Q.

The pressing of the push button 3UG energizes the up call registering relay 3UR to close its self-holding contact members 3UR1 and also its contact members 3UR2. The closing of the contact members 3UR2 inserts the call resistor r18 in parallel with the call resistors r17 and r19 in the quota relay circuit, this circuit extending L+4, 3UR2, r18, AS5, BS5, CS5, Q, L—4

As previously stated, the call resistors are so proportioned with reference to the relay Q that when three of them are connected in parallel circuit with the relay Q they pass enough current through the circuit to energize that relay. Hence the relay Q is now energized by the operated condition of three call registering relays, this being the predetermined number selected in this case to cause operation of the relay.

It will also be assumed that these push buttons are pressed by the waiting passengers almost simultaneously and before the expiration of the timing interval for the next dispatching signal so that they will cause the quota relay to act and give a dispatching signal to send the next car to them immediately without waiting for the expiration of the usual dispatching interval.

Returning now to the arrival of car A at the upper terminal, the arrival of that car closed its terminal switch AC thereby energizing its terminal relay AT. The energized relay AT closes its contact members AT1 and AT2. The closed contact members AT1 prepare the circuit of the "next" relay AN for operation and the closed contact members AT2 prepare the circuit of the "start" relay AS for energization.

As before described, the ring relays keep up their sequential operation and close their contact members 1R1 and 2R2 in the prepared circuit of the relay AN, thus energizing that relay to close its contact members AN4, thereby lighting the signal lamp AL in car A and causing it to glow steadily to indicate to the attendant in that car that it will be the next to receive the starting signal, to close its contact members AN1 to prepare the circuit of its starting relay AS for operation when the timing relays 1M to 5M are in energized condition to give the next impulse for the starting signal, and to open its contact members AN3 in one side of the circuit for the interval relays 1M to 5M to cause them to be deenergized when the starting signal is given.

The closing of the contact members AN2 energizes the stop sequence relay SS to close its contact members SS1 to SS4, inclusive, in the circuits of the ring relays 1R to 4R, thus maintaining energization of the relays 1R and 2R and preventing the energization of the relays 3R and 4R because of the inclusion of the resistors R10 to R13 in the circuits for the ring relays.

It is now seen that car A is selected as the next car to receive the dispatching signal and will receive that signal as soon as the timing motor and interval relays operate to give the next starting impulse upon the expiration of the predetermined time selected. However, we have seen that the registration of three stop calls, that is, on buttons 4DG and 3DG and on 3UG, have caused the quota relay Q to be energized to give a starting signal immediately without waiting until the expiration of the usual timing interval.

The energized quota relay Q closes its contact members Q1 thereby energizing the "start" relay AS by the circuit L+3, Q1, AN1, AS, AT2, L—3. The energized start relay AS closes its self-holding contact members AS2 and also opens its contact members AS4 and AS5 and closes its contact members AS3. The opening of the contact members AS4 deenergizes such of the interval relays 1M to 5M as have been energized by the operation of the timing motor so that the interval relays start all over again to set up the next predetermined time interval. The opening of the contact members AS1 deenergizes the "next" relay AN, so that some other car can be selected for the next dispatching signal. The deenergized relay AN opens its contact members AN4, thus stopping the steady glow of the lamp AL and thereby extinguishing the "next" signal for the attendant in car A.

The closing of the contact members AS3 energizes the flicker relay Y which opens and closes its contact members to cause the lamp AL in car A to flicker, thereby giving the attendant in that car a "start" signal to indicate that he should start on his down trip immediately.

The opening of the contact members AS5 deenergizes the quota relay Q and returns it to its normal condition.

By the foregoing operation it is seen that the operated condition of three call registering relays, regardless of whether they are up or down call relays, causes the quota relay Q to operate immediately to give a dispatching signal to the next car at the dispatching floor without waiting for the expiration of the usual timing interval. Thus the registration of a predetermined number of stop calls causes a car to be dispatched immediately to answer them, and the operation of the start relay in dispatching that car returns the quota relay to normal condition, that is, the condition it takes when not actuated as the result of a predetermined number of calls being registered.

Assuming now that the attendant in car A, upon receiving the "start signal," moves the car switch MS in a clockwise direction to start on a down trip. This operation of the car switch causes the car to move downwardly and as it leaves the floor it opens its floor switch AC, thereby deenergizing its terminal relay AT. The deenergized relay AT operates to deenergize the "next" relay AN and the "start" relay AS and return them to normal condition, thus starting the ring relays 1R to 4R, stopping the "start" signal and preparing the quota relay for another operation.

When the switch MS was operated to start car A downwardly, it energized the down relay D which not only started the car downwardly, but opened its contact members D5 in the circuit of the up direction relay W which caused that relay to close its contact members W3 in the down direction relay X, thereby energizing that relay for the down direction. The energized relay X closes its contact members X4, thereby inserting the preventive resistor r24 in parallel with the coil of the quota relay Q by the following circuit: (lower right-hand corner Fig. 4) L+4, then in parallel through 4DR2, r17, and 3UR2, r18 and 3DR2, r19, then in series through AS5, BS5, CS5 and then in parallel through coil Q and also r24, X4, P2, AT3 to L—4. When the contact members AS5 reclosed as car A left the floor, the operation of car A caused the preventive resistor r24 to be inserted in parallel with the relay Q. This inclusion of the resistor r24 in parallel with the relay Q prevents that relay from being again energized, even though parallel circuits still extend through the call resistors r17, r18 and r19, until an additional predetermined number of stop calls are registered.

It will be assumed now that car B moves into the upper terminal and in so doing closes its terminal switch BC thereby energizing its terminal relay BT. The ring relays IR to 4R are continuing their ring action and ultimately close the contact members 2R3 and 3R2, thereby energizing the "next" relay BN by the circuit L+3, 2R3, 3R2, BSI, BN, BTI, L—3. The energized relay BN closes its contact members BN4 to light the dispatching lamp BL in car B to give it the "next" to start signal, closes its contact members BN2 to energize the stop sequence relay SS to stop the sequence operation of the ring relays IR to 4R, closes its contact members BNI to prepare the "start" relay BS4 for operation, and opens its contact members BN3 in the circuit of the interval relays.

Although car B is now the "next" car to receive the dispatching signal, all of the timing relays IM to 5M have not yet been energized and therefore car B does not yet receive the timing interval dispatching signal to start.

It will be assumed that before car A is able to answer the three calls already registered, three additional calls are registered, one down at the second floor, one up at the first floor and one up at the second floor. These calls are registered by the waiting passengers pressing the buttons 2UG, 2DG and IUG. The closing of the button 2UG energizes the call registering relay 2UR to close its contact members 2URI and 2UR2. The closed contact members 2URI provide a self-holding circuit for 2UR and energize the car stopping floor contact segments a2, Ba2 and Ca2 (not shown). The closed contact members 2UR2 include the call resistor r20 in parallel in the circuit to the quota relay Q, but relay Q is not energized even though the circuit for the relay Q is still connected through call resistors r17, r18, r19, because the preventive resistor r24 is connected in parallel with the coil of relay Q.

The pressing of the down button 2DG for the down call at the second floor energizes the down call registering relay 2UR to close its contact members 2DRI and 2DR2. The closed contact members 2DRI provide a self-holding circuit for relay 2DR and energizes the car stopping contact segments e2, Be2, and Ce2 (not shown). The closed contact members 2DR2 include the call resistor r21 in parallel with the other connected call resistors in the circuit of the quota relay Q, but relay Q is not yet again operated because of the preventive resistor r24 included in parallel with it.

The pressing of the up button IUG energizes the up call registering relay IUR to close its contact members IURI and IUR2. The closed contact members IURI complete a self-holding circuit for the call registering relay IUR and energize the car stopping contact segments el, Bel and Cel (not shown). The closed contact members IUR2 connect the call resistor r22 in parallel with the other connected call resistors in the circuit of the quota relay Q. Inasmuch as six call resistors are now included in parallel in the circuit of the relay Q, they will pass sufficient current to overcome the effect of the preventive resistor r24 and energize the quota relay Q (lower right-hand portion Fig. 4).

The energized relay Q closes its contact members QI, thereby energizing the "start" relay BS by the circuit L+3, QI, BNI, BS, BT2, L—3. The energized relay BS opens its contact members BSI, closes its contact members BS2 and BS3 and opens its contact members BS4 and BS5. The opening of the contact members BSI deenergizes the "next" relay BN to open its contact members BN2 to stop sequence relay SS and thus start the ring relays IR to 4R in operation towards selecting the next car. The closing of the contact members BS2 provides a self-holding circuit for the relay BS. The opening of the contact members BS4 deenergizes the interval relays and prepares them to start again building up of another timing interval. The opening of the contact members BS5 deenergizes the quota relay Q. The closing of the contact members BS3 energizes the flickering relay Y to cause the lamp BL in car B to flicker, thus giving the attendant in that car a signal to start immediately on his down trip.

As the attendant receives the "start" signal in car B on his dispatching lamp BL, he moves his car switch to start downwardly. As car B leaves the upper terminal, it opens its floor switch BC, thus deenergizing its terminal relay BT which opens its contact members BTI to prevent reoperation of the "next" relay BN for car B until that car is again at the upper terminal. The downward operation of car B also energizes its down direction relay BX which closes its contact members BX4, thereby including the preventive resistor r25 in parallel with the preventive resistor r24 and the quota relay Q. Hence as long as all the registered calls now set up remain in existence, it will require an additional predetermined number of three registered calls to cause the quota relay to again operate immediately.

By reason of the foregoing operation of car B, it is seen how the preventive resistors r24 to r26 operate to prevent the quota relay Q from being again operated immediately after one operation until an additional predetermined number of stop calls are registered. In the present case three calls have been selected as the predetermined number of registered calls required to cause immediate operation of the quota relay, but it will be apparent that any desired number of calls may be selected, provided the call resistors and the preventive resistors are proportioned to take care of such selected predetermined number of calls.

However, it will be assumed that car A, on its way down, now makes a stop at the fourth floor, and in doing so, causes its down brush 40 on its floor selector to engage the down cancellation contact b4, thereby energizing the down cancellation coil 4DRN by the circuit L+1, 4DRI, 4DRN, b4, 40, U6, D6, L—I. The energization of the cancellation coil 4DRN overcomes the energization of the coil 4DR and thereby restores that coil to its deenergized condition which causes it to open its contact members 4DRI and 4DR2. The opening of the contact members 4DR2 disconnects the call resistor r17 from the circuit of the quota relay Q. As the car answers the registered calls, they cancel these registered calls and remove the call resistors from the circuit of relay Q. This operation eventually restores the system to its normal condition where the timing apparatus will operate the dispatching signals at the predetermined time intervals and cause the cars to be dispatched in the usual way. However, if the registered calls pile up at any time beyond the predetermined quota number, the quota relay Q moves into action and gives an immediate starting signal for the next car.

As an illustration of the operation of the bypass buttons in the cars, it will be assumed that the attendant on car B, after starting on his down trip, presses the by-pass button BPP in his car to prevent his car from answering the registered stop calls. The pressing of the button BPP energizes the relay BP to open its contact members BP1 and BP2. The opening of the contact members BP1 prevents the stopping relay BH of car B from being energized to stop that car as it approaches a registered stop call. The opening of the contact members BP2 disconnects the preventive resistor r25 from its position in parallel with the quota relay Q, thus rendering the quota relay again responsive to the registered calls to give car C an immediate "start" signal.

By the use of the by-pass relays, it is seen how the quota means will adjust itself to keep on giving an immediate start signal for each set of three registered calls accumulated, and that if one of the cars by-passes such stop calls, another car will be selected to receive immediately a "start" signal.

If desired, the system for operating the signal lamps may be duplicated for a pair of dispatching floors. Any two floors may be selected as the dispatching floors but usually the cars are dispatched from the upper terminal and the lower terminal. Our quota system will probably be most useful when used at the upper terminal, but in many installations it will be found desirable to operate the dispatching signal lamps at both terminals or at any other floors selected as dispatching floors. For this reason, we have provided an auxiliary quota relay QA which is operated by the contact members Q2 of relay Q whenever that relay is energized (see lower right-hand corner Fig. 4). Thus when the quota relay Q is energized to give a dispatching signal at the upper terminal, it energizes the auxiliary quota relay QA to cause the giving of a dispatching signal at the lower terminal by circuits similar to those shown for the top terminal. This prevents the cars from becoming bunched and causes them to be dispatched from the terminals at the best rate for good service.

Hence, it will be understood that we have provided a simple and inexpensive quota and dispatching means which will give dispatching signals to the cars at such times as will secure the most efficient operation of the cars.

Although we have illustrated and described only one specific embodiment of our invention, it is to be understood that many changes thereof and modifications therein may be made without departing from its spirit and scope.

We claim as our invention:

1. A signal system for a plurality of cars serving a plurality of floors including a dispatching floor, comprising a plurality of devices for registering stop calls for the cars at the floors, said devices being common to all the cars, a signal means for each car, and means common to all the cars and responsive to a predetermined plurality of said call registering devices being in operated condition for operating the signal means of one of the cars at the dispatching floor to give that car a starting signal.

2. In an elevator system for a plurality of cars serving a plurality of floors including a dispatching floor, a plurality of devices common to all the cars for registering stop calls for the cars at the floors, a signal means for each car, a quota means common to all the cars and responsive to the existence of a predetermined number of registered stop calls on said registering devices for causing operation of the signal means of one of the cars at the dispatching floor to give that car a start signal, and means responsive to operation of the signal means for giving the start signal for restoring the quota means to its normal condition.

3. In an elevator system for a plurality of cars serving a plurality of floors including a dispatching floor, a plurality of devices common to all the cars for registering stop calls for the cars at the floors, a signal means for each car, a quota means common to all the cars responsive to a predetermined number of said call registering devices being in operation for causing operation of the signal means of one of the cars at the dispatching floors to give that car a start signal, means responsive to operation of the signal means for giving the start signal for restoring the quota means to its inactive condition, and means responsive to operation of the car receiving said start signal for preventing another operation of the quota means until an additional predetermined number of call registering devices are in operated condition.

4. A signal system for an elevator system having a plurality of cars serving an upper terminal floor, a lower terminal floor and a plurality of intermediate floors, comprising an up call registering device for the lower terminal floor and each of the intermediate floors, a down call registering device for the upper terminal floor and each of the intermediate floors, a dispatch signal device for each of the cars, and quota means operably responsive to the number of cars travelling down and to a predetermined number of call registering devices being in operated condition for causing operation of the signal device of one of the cars at the upper terminal floor.

5. A signal system for an elevator system having a plurality of cars serving an upper terminal floor, a lower terminal floor and a plurality of intermediate floors, one of said floors being a dispatching floor, comprising an up call device at the lower terminal floor and each of the intermediate floors, a down call device at the upper terminal floor and each of the intermediate floors, a call registering device for each call device and connected for operation thereby to register calls for the cars, said registering devices being common to all the cars, a signal device associated with each car, means for selecting the car next to be given a starting signal at the dispatching floor, and a quota means common to all the cars and responsive to a predetermined number of said call registering devices being in operated condition for causing operation of the signal device of the car selected for the next starting signal to give it a starting signal.

6. A signal system for an elevator system having a plurality of cars serving an upper terminal floor, a lower terminal floor and a plurality of intermediate floors, one of said floors being a dispatching floor, comprising an up call device at the lower terminal floor and each of the intermediate floors, a down call device at the upper terminal floor and each of the intermediate floors, a call registering device for each call device and connected for operation thereby to register stop calls for the cars, a signal device associated with each car, means for selecting the car next to be given a starting signal at the dispatching floor, and a quota means responsive to the number of cars travelling away from the dispatching floor and to a predetermined number of call registering devices being in operated condition for operating the signal device of the car selected for the next starting signal to give it a starting signal.

7. A signal system for an elevator system having a plurality of cars serving an upper terminal floor, a lower terminal floor and a plurality of intermediate floors, one of said floors being a dispatching floor, comprising an up call device at the lower terminal floor and each of the intermediate floors, a down call device at the upper terminal floor and each of the intermediate floors, a call registering device for each call device and connected for operation thereby to register calls for the cars, a signal device associated with each car, means for selecting the car next to be given a starting signal at the dispatching floor, a quota means responsive to the number of cars travelling away from the dispatching floor and to a predetermined number of call registering devices being in operated condition for operating the signal device of the car selected for the next starting signal to give it a starting signal, and means responsive to operation of the quota means in giving said starting signal for restoring the quota means to inactive condition.

8. A signal system for an elevator system having a plurality of cars serving an upper terminal floor, a lower terminal floor and a plurality of intermediate floors, one of said floors being a dispatching floor, comprising an up call device at the lower terminal floor and each of the intermediate floors, a down call device at the upper terminal floor and each of the intermediate floors, a call registering device for each call device and connected for operation thereby to register calls for the cars, said registering devices being common to all the cars, a signal device associated with each car, means for selecting the car next to be given a starting signal from the dispatching floor, a signal operating means associated with each signal device, a quota means common to all the cars and responsive to a predetermined number of said call registering devices being in operated condition for operating the signal operating means for the car selected for the next starting signal, means responsive to operation of said operated signal operating means for restoring the quota means to its inactive condition and for operating the signal device with which it is associated to give a starting signal to said next car and for maintaining that starting signal until said next car leaves the dispatching floor, and means responsive to said next car leaving the dispatching floor in answer to said starting signal for cancelling the starting signal and restoring the operated signal starting means to its unoperated condition.

9. In an elevator signal system for a plurality of cars serving a plurality of floors including a dispatching floor, a plurality of call registering devices, one for each floor, a signal device for each car, a quota relay, a circuit for connecting the quota relay to a source of energy, a plurality of call resistors, one for each call registering device, disposed in said circuit in parallel with each other and in series with the quota relay, means responsive to the operation of each call registering relay for connecting its corresponding resistor in said circuit to permit energy to flow through that resistor to the quota relay, said resistors and said relay being proportioned to cause the relay to be operated when its circuit is connected through a predetermined number of resistors, and means responsive to operation of the relay for causing the signal device of the "next" car at the dispatching floor to give that car a start signal.

10. In an elevator signal system for a plurality of cars serving a plurality of floors including a dispatching floor, a plurality of call registering devices for registering stop calls for the cars at the floors, one call registering device for each floor, a plurality of dispatching signal devices, one for each car, means for selecting the car to be next to receive a starting signal, a quota relay responsive to a predetermined number of call registering devices being in operated condition for operating the signal device of the next car at the dispatching floor which should receive the next starting signal to give it a starting signal, preventing means associated with each car and responsive to that car being conditioned to leave the dispatching floor for preventing operation of the quota means, a by-pass means for each car whereby that car may be conditioned to pass any registered stop calls at floors without answering them, and means responsive to operation of a by-pass means associated with that car for rendering ineffective the preventing means associated with that car whereby a car making a run from the dispatching floor without answering the stop calls registered for it will not affect the operation of the quota means.

11. In an elevator signal system for a plurality of cars serving a plurality of floors including a dispatching floor, a plurality of call registering devices for registering stop calls for the cars at the floors, one call registering device for each floor, a plurality of dispatching signal devices, one for each car, means for selecting the car to be next to receive a starting signal, a quota relay responsive to a predetermined number of call registering devices being in operated condition for operating the signal device of the next car at the dispatching floor which should receive the next starting signal to give it a starting signal, a plurality of preventive resistors, one for each car, disposed for connection in parallel circuit with the quota relay, and means responsive to the operation of a car away from the dispatching floor for connecting the resistor associated with that car in its parallel circuit with the quota relay to provide a shunt circuit around the quota relay to render it inactive until a predetermined number of additional stop calls are registered.

12. In an elevator signal system for a plurality of cars serving a plurality of floors including a dispatching floor, a plurality of call registering devices for registering stop calls for the cars at the floors, one call registering device for each floor, a plurality of dispatching signal devices, one for each car, means for selecting the car to receive the next dispatching signal, a quota relay responsive to a predetermined number of call registering devices being in operated condition for operating the signal device of the next car at the dispatching floor which should receive the next starting signal to give it a starting signal, a plurality of preventive resistors, one for each car, means responsive to the operation of a car away from the dispatching floor for connecting the resistor associated with that car in its parallel circuit with the quota relay to provide a shunt circuit around the quota relay to render it inactive until a predetermined number of additional stop calls are registered, a by-pass means for each car for causing it to pass by registered stop calls without answering them, and means responsive to operation of the by-pass means for a car for preventing it from including its preventing resistor in a circuit parallel with the quota relay, so that operation of the car will not prevent operation of the quota relay.

13. In an elevator signal system for a plurality of cars serving a plurality of floors including a dispatching floor, a plurality of call registering devices for registering stop calls for the cars at the floors, one call registering device for each floor, a plurality of dispatching signal devices, one for each car, means for selecting the car next to receive a starting signal, a quota relay responsive to a predetermined number of call registering devices being in operated condition for operating the signal device of the next car at the dispatching floor which should receive the next starting signal to give it a starting signal, a plurality of preventive resistors, one for each car, disposed for connection in parallel circuit with the quota relay to render that relay inactive, and means responsive to the presence of any car at the dispatching floor for preventing the connection of the preventive resistor for that car in parallel circuit with the quota relay.

14. An elevator signal system for a plurality of cars serving a plurality of floors, comprising a plurality of call registering devices for registering stop calls for the cars to stop at the floors, a plurality of dispatching signal devices, one for each car, a quota device, a circuit for the quota device, a plurality of call resistors, one for each call registering device, means responsive to operation of the call registering devices for connecting the call resistors in the circuit of the quota device to cause the quota device to be operated when a predetermined number of call registering devices are in operated condition, means responsive to operation of the quota device for operating the signal device of a car to give it a start signal, a plurality of preventing resistors, one for each car, and means responsive to operation of a car in response to a "start" signal for restoring the quota device to normal condition and for connecting the preventing resistor associated with that car in the circuit for the quota device to prevent operation of the quota device while that said car is answering the said predetermined number of operated call registering devices until an additional predetermined number of call registering devices are in operated condition.

15. In an elevator signal system for a plurality of cars serving a plurality of floors, a plurality of call devices common to all the cars for registering stop calls for the cars at the floors, one call device for each floor, a plurality of dispatching signal devices, one for each car, a timing mechanism for operating the signal devices to give starting signals to the cars at predetermined intervals of time, and means common to all the cars and responsive to a predetermined number of call devices being in operated condition simultaneously for operating one of the signal devices to give the car associated therewith a starting signal without waiting for the expiration of a timing interval.

16. In an elevator signal system for a plurality of cars serving a plurality of floors including a dispatching floor, a call device for each floor for registering stop calls for the cars at that floor, said call devices being common to all the cars, a dispatching signal device for each car, a timing mechanism for operating the signal devices to give starting signals to the cars at predetermined intervals of time when they are at the dispatching floor, means for selecting the car at the dispatching floor which will be next to receive a starting signal, and a quota relay common to all the cars and responsive to a predetermined number of call devices being in operated condition for promptly operating the signal device of the car selected for the next starting signal to give it a starting signal at once without waiting for the expiration of the timing interval.

17. In an elevator signal system for a plurality of cars serving a plurality of floors, a dispatching signal device for each car, a timing mechanism for operating the signal devices at predetermined intervals of time to give starting signals to the cars, a down call registering device for each floor for registering stop calls for the cars at that floor, said registering devices being common to all the cars, and means common to all the cars and responsive to the simultaneous registration of down stop calls for a predetermined number of floors for causing immediate operation of the signal device of the car disposed to receive the next starting signal without waiting until the expiration of the timing interval.

18. In an elevator signal system for a plurality of cars serving a plurality of floors including a dispatching floor, a call device at each floor, a registering device for each call device and responsive to operation of that call device for registering a stop call for a car at the floor of the operated call device, said registering devices being common to all the cars, a signal device for each car, a timing mechanism for operating the signal devices to give starting signals to the cars at predetermined intervals of time at the dispatching floor, a quota device common to all the cars and responsive to a predetermined number of call registering devices being in operated condition for operating the signal device of a car at the dispatching floor to give it an immediate starting signal, and means responsive to departure from the dispatching floor of the car receiving said immediate starting signal for rendering said quota device inactive until a predetermined number of additional stop calls are registered.

19. In an elevator signal system for a plurality of cars serving a plurality of floors including a dispatching floor, a plurality of call registering devices for registering stop calls for the cars at the floors, said registering devices being common to all the cars, one call registering device for each floor, a plurality of dispatching signal devices, one for each car, means for selecting the car to be next to receive a starting signal, a timing mechanism for operating the signal devices to give starting signals to the cars at the dispatching floor at predetermined intervals of time, a quota relay common to all the cars and responsive to a predetermined number of said call registering devices being in operated condition for operating the signal device of the next car at the dispatching floor which should receive the next starting signal to give it a starting signal without waiting for a timing interval, and means responsive to departure of said next car from the dispatching floor for rendering the quota means inoperative.

20. In an elevator signal system for a plurality of cars serving a plurality of floors including a dispatching floor, a plurality of call registering devices common to all the cars for registering stop calls for the cars at the floors, one call registering device for each floor, a plurality of dispatching signal devices, one for each car, means for selecting the car to be next to receive a starting signal, a timing mechanism for operating the signal devices to give starting signals to the cars at the dispatching floor at intervals of time, a quota relay common to all the cars and responsive to a predetermined number of call registering devices being in operated condition for operating the signal device of the next car at the dispatching floor which should receive the next starting signal to give it a starting signal without waiting for a timing interval, and means responsive to departure of any car from the dispatching floor for rendering the quota means inactive.

21. In an elevator system for a plurality of cars serving a plurality of floors two of which floors are selected as dispatching floors, a plurality of devices for registering stop calls for the cars at the floors, a signal device for each car, a quota device, means responsive to a predetermined number of call registering devices being in operated condition for operating the quota device, means responsive to operation of the quota device for operating the signal device of a car at one of the dispatching floors to give that car a dispatching signal, an auxiliary quota device, and means responsive to operation of the quota device for operating the auxiliary quota device to cause operation of the signal device of a car at the other dispatching floor to give that car a dispatching signal.

22. In an elevator system for a plurality of cars serving a plurality of floors including a dispatching floor, a plurality of call devices for registering stop calls for the cars at the floors, a signal device for each car, a quota device responsive to a predetermined number of call devices being in operated condition for causing operation of the signal device of the car next to leave the dispatching floor to give that car an immediate dispatching signal, and means responsive to the number of down moving cars for determining how many call devices must be in operated condition before the quota device may effect operation of the signal device of another car at the dispatching floor to give it an immediate dispatching signal.

HAROLD W. WILLIAMS.
RICHARD W. JONES.